United States Patent
Chu et al.

(10) Patent No.: US 11,558,847 B2
(45) Date of Patent: *Jan. 17, 2023

(54) MULTI-USER NULL DATA PACKET (NDP) RANGING

(71) Applicant: NXP USA, INC., Austin, TX (US)

(72) Inventors: Liwen Chu, San Ramon, CA (US); Hongyuan Zhang, Fremont, CA (US); Christian R. Berger, San Jose, CA (US); Niranjan Grandhe, San Jose, CA (US); Sudhir Srinivasa, Los Gatos, CA (US); Hui-ling Lou, Sunnyvale, CA (US)

(73) Assignee: NXP USA, INC., Austin, TX (US)

(*) Notice: Subject to any disclaimer, the term of this patent is extended or adjusted under 35 U.S.C. 154(b) by 112 days.

This patent is subject to a terminal disclaimer.

(21) Appl. No.: 17/100,252

(22) Filed: Nov. 20, 2020

(65) Prior Publication Data

US 2021/0075575 A1  Mar. 11, 2021

Related U.S. Application Data

(63) Continuation of application No. 16/054,484, filed on Aug. 3, 2018, now Pat. No. 10,848,288.

(60) Provisional application No. 62/542,614, filed on Aug. 8, 2017.

(51) Int. Cl.
*H04W 64/00* (2009.01)
*H04L 5/00* (2006.01)
*H04L 1/00* (2006.01)
*H04W 8/00* (2009.01)
*H04W 24/10* (2009.01)

(52) U.S. Cl.
CPC .......... *H04W 64/00* (2013.01); *H04L 1/0083* (2013.01); *H04L 5/0051* (2013.01); *H04W 8/005* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 10,928,505 B1* | 2/2021 | Chu | G01S 13/765 |
| 11,166,159 B1* | 11/2021 | Berger | H04L 9/06 |
| 2017/0325230 A1* | 11/2017 | Abraham | H04W 72/02 |
| 2018/0249437 A1* | 8/2018 | Lindskog | H04W 24/10 |
| 2018/0310273 A1* | 10/2018 | Chu | G01S 5/0036 |
| 2019/0052428 A1* | 2/2019 | Chu | H04W 24/10 |

* cited by examiner

*Primary Examiner* — Phirin Sam

(57) ABSTRACT

A first communication device prompts a plurality of second communication devices to transmit, during a contiguous time period reserved for a range measurement exchange, respective first null data packets (NDPs) at respective times. The first communication device receives first NDPs from at least some of the second communication devices during the contiguous time period, and transmits one or more second NDPs to the plurality of second communication devices. The first communication device uses reception of the first NDPs and transmission of the one or more second NDPs to determine respective ranges between the first communication device and respective second communication devices.

17 Claims, 9 Drawing Sheets

MULTI-USER NULL DATA PACKET (NDP) RANGING

CROSS REFERENCES TO RELATED APPLICATIONS

This application is a continuation application of U.S. patent application entitled "MULTI-USER NULL DATA PACKET (NDP) RANGING", having a serial number of 16/054484, having a filing date of Aug. 3, 2018; which claims the benefit of U.S. provisional application entitled "RANGING WITH NEAR FAR STAs", having a serial number of 62/542614, and having a filling date of Aug. 8, 2017, having common inventors, and having a common assignee, all of which is incorporated by reference in its entirety.

FIELD OF TECHNOLOGY

The present disclosure relates generally to wireless communication systems, and more particularly to communication exchanges between wireless communication devices for measuring distances among the wireless communication devices.

BACKGROUND

Wireless local area networks (WLANs) have evolved rapidly over the past decade, and development of WLAN standards such as the Institute for Electrical and Electronics Engineers (IEEE) 802.111 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method for performing a ranging measurement procedure includes: prompting, at a first communication device, a plurality of second communication devices to transmit, during a contiguous time period reserved for a range measurement exchange, respective first null data packets (NDPs) at respective times; receiving, at the first communication device, first NDPs from at least: some of the second communication devices during the contiguous time period; transmitting, by the first communication device, one or more second NDPs to the plurality of second communication devices; and using, at the first communication device, reception of the first NDPs and transmission of the one or more second NDPs to determine respective ranges between the first communication device and respective second communication devices.

In another embodiment, an apparatus comprises a network interface device associated with a first communication device. The network interface device is implemented on one or more integrated circuit (IC) devices, and is configured to: prompt a plurality of second communication devices to transmit, during a contiguous time period reserved for a range measurement exchange, respective first null data packets (NDPs) at respective times, receive first NDPs from at least some of the second communication devices during the contiguous time period, transmit one or more second NDPs to the plurality of second communication devices, and use reception of the first NDPs and transmission of the one or more second NDPs to determine respective ranges between the first communication device and respective second communication devices.

In yet another embodiment, a method for performing a ranging measurement procedure includes: receiving, at a first communication device, a packet from a second communication device, the packet including information configured to prompt the first communication device to transmit a first null data packet (NDP) during a contiguous time period reserved for a range measurement exchange involving the first communication, the second communication device, and one or more other communication devices; responsive to receiving the packet, transmitting, by the first communication device, the first NDP to the second communication device during the contiguous time period; receiving, by the first communication device, a second NDP from the second communication during the contiguous time period; and using, at the first communication device, transmission of the first NDP and reception of the second NDP to determine a range between the first communication device and the second communication device.

In still another embodiment, an apparatus comprises: a network interface device associated with a first communication device. The network interface device is implemented on one or more integrated circuit (IC) devices, and is configured to: receive a packet from a second communication device, the packet including information configured to prompt the first communication device to transmit a first null data packet (NDP) during a contiguous time period reserved for a range measurement exchange involving the first communication, the second communication device, and one or more other communication devices, responsive to receiving the packet, transmits the first NDP to the second communication device during the contiguous time period, receive a second NDP from the second communication during the contiguous time period, and use transmission of the first NDP and reception of the second NDP to determine a range between the first communication device and the second communication device.

DETAILED DESCRIPTION

Techniques for performing ranging measurement packet exchanges among a group of communication devices described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement techniques are utilized in other types of wireless communication systems such as personal area networks (PANs), mobile communication networks such as cellular networks, metropolitan area networks (MANs), etc.

Figure 1:
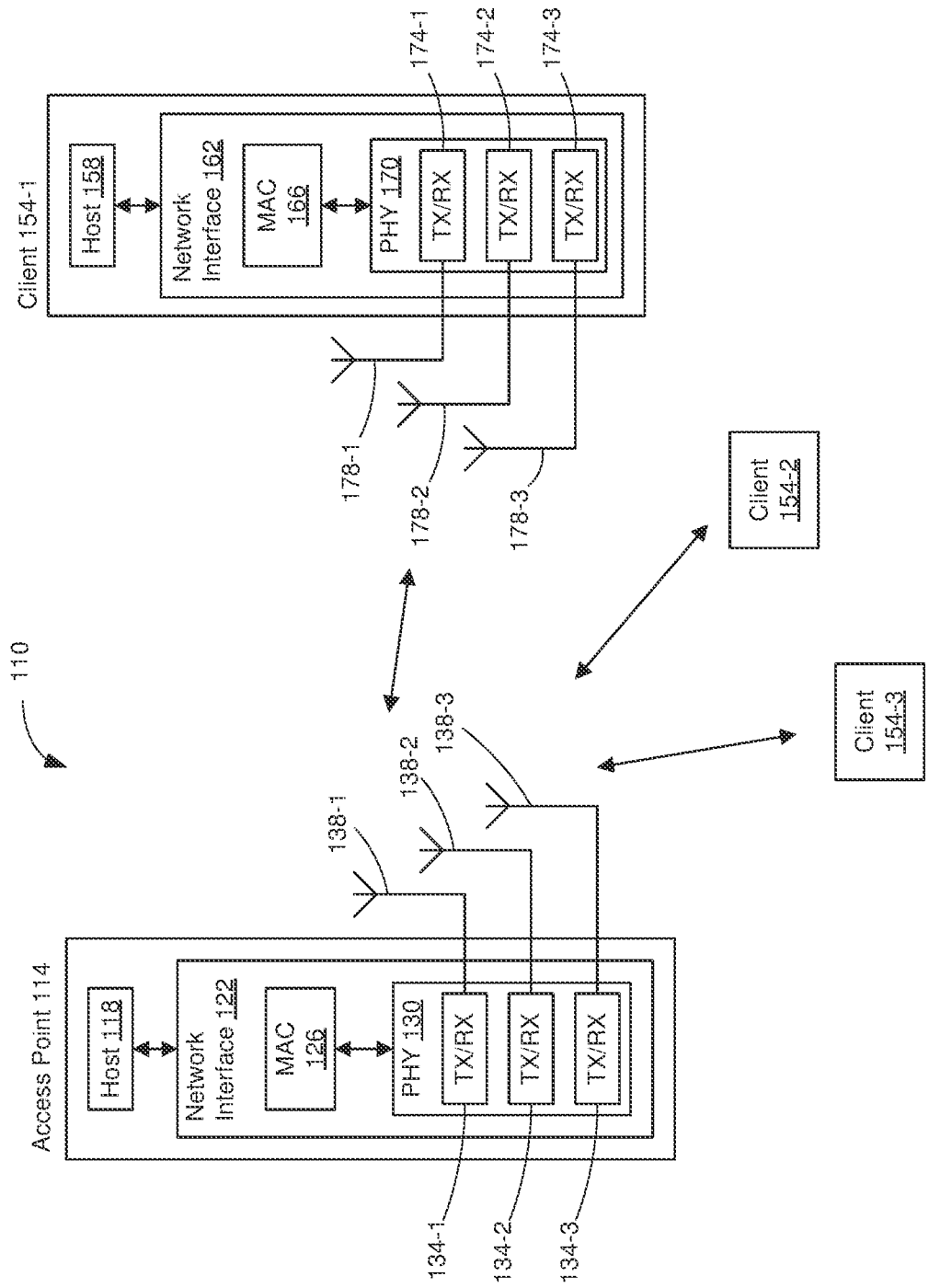
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may he implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 1110 includes a plurality of client stations 154. Although three client, stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
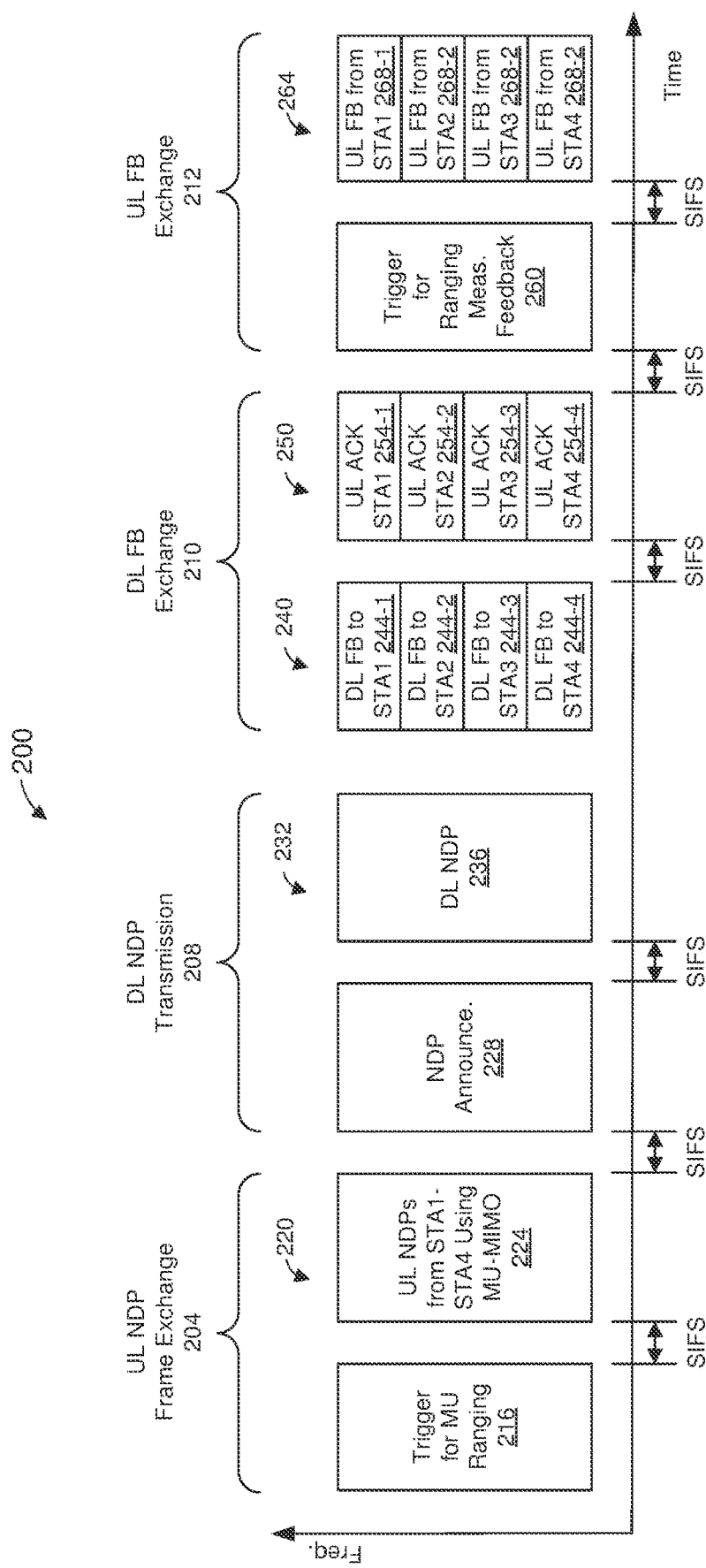
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

According to an embodiment, an MU ranging measurement exchange, such as the MU ranging measurement exchange 200, is an exchange of packets between at least three communication devices (e.g., an AP and at least two client stations) during a contiguous time period reserved for range measurement purposes, wherein the exchange of packets includes i) NDPs, and ii) one or more packets related to the transmission of the NDPs (e.g., a packet that prompts transmission of an uplink NDP, a packet that announces transmission of a subsequent downlink NDP, etc.).

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback frame exchange 210, and an UL feedback frame exchange 212. In an embodiment, the MU ranging measurement exchange 200 also includes a station readiness poll, which is not shown in FIG. 2. In an embodiment, the uplink UL NDP frame exchange 204, the DL NDP transmission portion 208, the DL feedback frame exchange 210, and the UL feedback frame exchange 212 occur within a single transmit opportunity period (TXOP). In another embodiment, the uplink UL NDP frame exchange 204, the DL NDP transmission portion 208, the DL feedback frame exchange 210, and the. UL feedback frame exchange 212 do not occur within a single TXOP. For example, the uplink UL NDP frame exchange 204 and the DL NDP transmission portion 208 occur within a single TXOP, whereas the DL feedback frame exchange 210 and the UL feedback frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. In an embodiment, each PHY preamble of each UL NDP 224 includes i) a legacy portion having a legacy STF (L-STF), a legacy LTF (L-LTF), and a legacy signal field (L-SIG), and ii) a non-legacy portion having a high efficiency STF (HE-STF), one or more high efficiency WiFi LTFs (HE-LTFs), and a high efficiency WiFi signal field (HE-SIG). The UL NDPs 224 omit data portions.

When transmitting the UL NDPs 224, each client station 154 records a time $t_{1,k}$ at which the client station 154 began transmitting a particular portion of the UL NDP 224 (e.g., a first occurring HE-LTF in the UL NDP 224), where k is an index indicating the particular client station 154. Similarly, when the AP 114 receives each UL NDP 224, the AP 114 records a time $t_{2,k}$ at which the AP 114 began receiving the particular portion of the UL NDP 224 (e.g., the first occurring HE-LTF in the UL NDP 224).

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
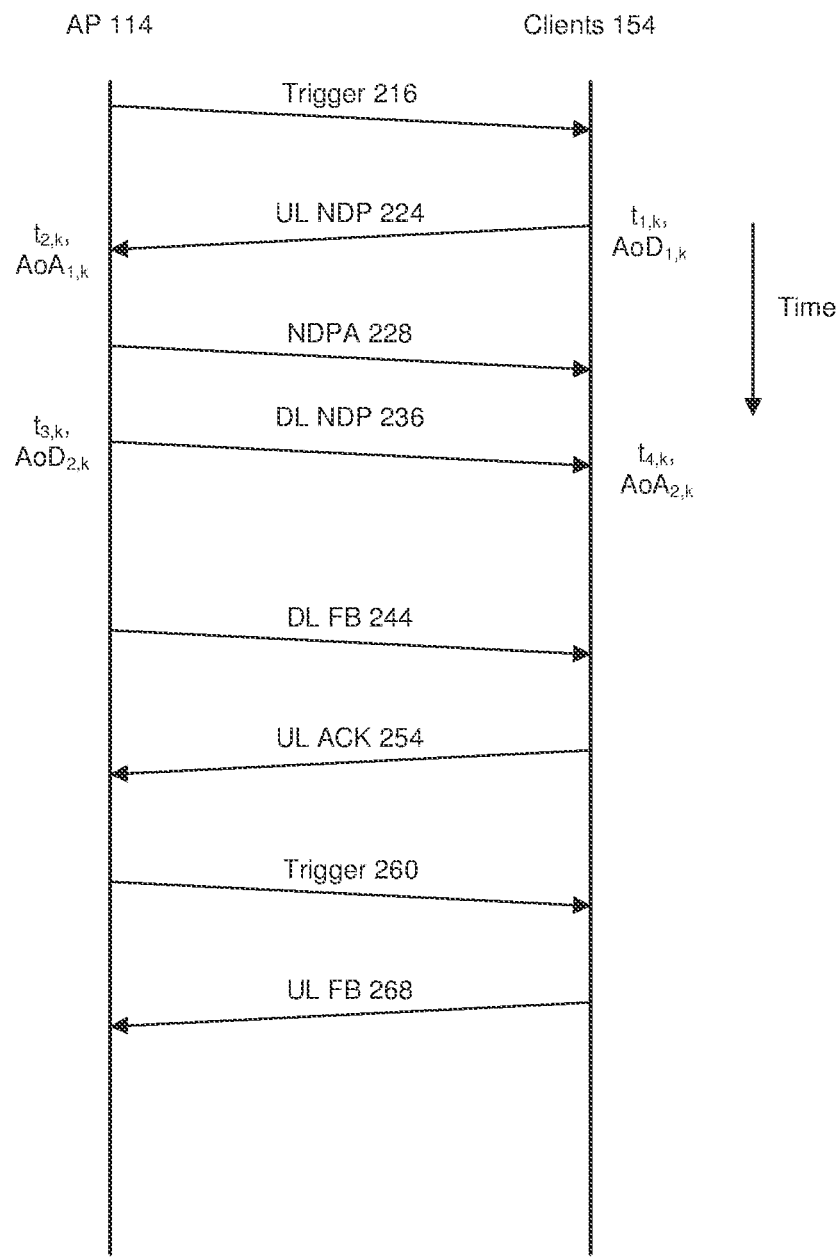
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the particular portion of the UL NDP 224 (e.g., the first occurring HE-LTF in the UL NDP 224), and records the $AoD_{1,k}$ at which the UL NDP 224 left the antennas 178 of the client station 154. Additionally, the AP 114 records the time $t_{2,k}$ at which the AP 114 began receiving the respective particular portion of each UL NDP 224 (e.g., the first occurring HE-LTF in the UL NDP 224), and the $AoA_{1,k}$, at which each respective UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 1114 transmits a single DL NDP 236 using a SU DL transmission (e.g., with a broadcast destination address) to the client stations 154. The DL NDP(s) 236 include PHY preamble(s) having one or more STFs, one or more LTFs and one or more signal fields, in an embodiment. In an embodiment, the PHY preamble of the DL NDP 236 includes i) a legacy portion having an L-STF, an L-LTF, and an L-SIG, and ii) a non-legacy portion having an HE-STF, one or more HE-LTFs, and one or more HE-SIGs. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting a particular portion of the DL NDP 236 (e.g., a first occurring HE-LTF in the DL NDP 236). Similarly, when each client station 154 receives the corresponding DL NDP 236, the client station 154 records a time $t_{4,k}$ at which the client station 154 began receiving the particular portion of the DL NDP 236 (e.g., the first occurring HE-LTF in the DL NDP 236). As illustrated in FIG. 2B, the AP 114 records the time $t_{3,k}$ at which the AP 114 began transmitting the particular portion of the DL NDP 236 (e.g., the first occurring HE-LTF in the DL NDP 236), and the client station 154 records the time $t_{4,k}$ at which the client station 154 began receiving the particular portion of the DL NDP 236 (e.g., the first occurring HE-LTF in the DL NDP 236).

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight, in some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not transmit the UL MU transmission 250 in order to reduce a duration of the MU ranging measurement exchange 200 and improve efficiency.

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes the recorded angles $AoD_{1,k}$ and $AoA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may he utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{1,k}$, and $AoA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

If a first client station 154 is significantly further away from the AP 114 than a second client station 154, a received power (as seen at the AP 114) of a first UL NDP 224 (part of the UL MU transmission 220) from the first client station may be significantly lower than a received power (as seen at the AP 114) of a second UL NDP 224 (part of the UL MU transmission 220) from the second client station, at least in some scenarios (sometimes referred to as a "near-far effect"). Such a near-far effect may adversely affect a ToA estimation(s) by the AP 114 of the first UL NDP 224 and/or the second UL NDP 224, e.g., because of inter-station interference caused by the near--far effect. Additionally, in some embodiments, client stations and APs belong to different classes, e.g., Class A and Class B, where different classes have different transmit power accuracy and RSSI estimation accuracy. When client stations of different classes participate in the UL MU transmission 220, ToA estimations) by the AP 114 of the first UL NDP 224 and/or the second UL NDP 224 may be adversely affected.

To address situations in which the near-far effect may degrade ToA estimation(s) by the AP 114 in connection with the UL MU transmission 220, several embodiments of MU ranging measurement exchanges that employ UL NDPs transmitted at different times are discussed below. The several embodiments of MU ranging measurement exchanges that employ UL NDPs transmitted at different times discussed below are also useful for avoiding or reducing situations in which STAs with different classes in one MU transmission may degrade ToA estimation(s) by the AP 114 (e.g., in connection with the UL MU transmission 220).

Figure 3:
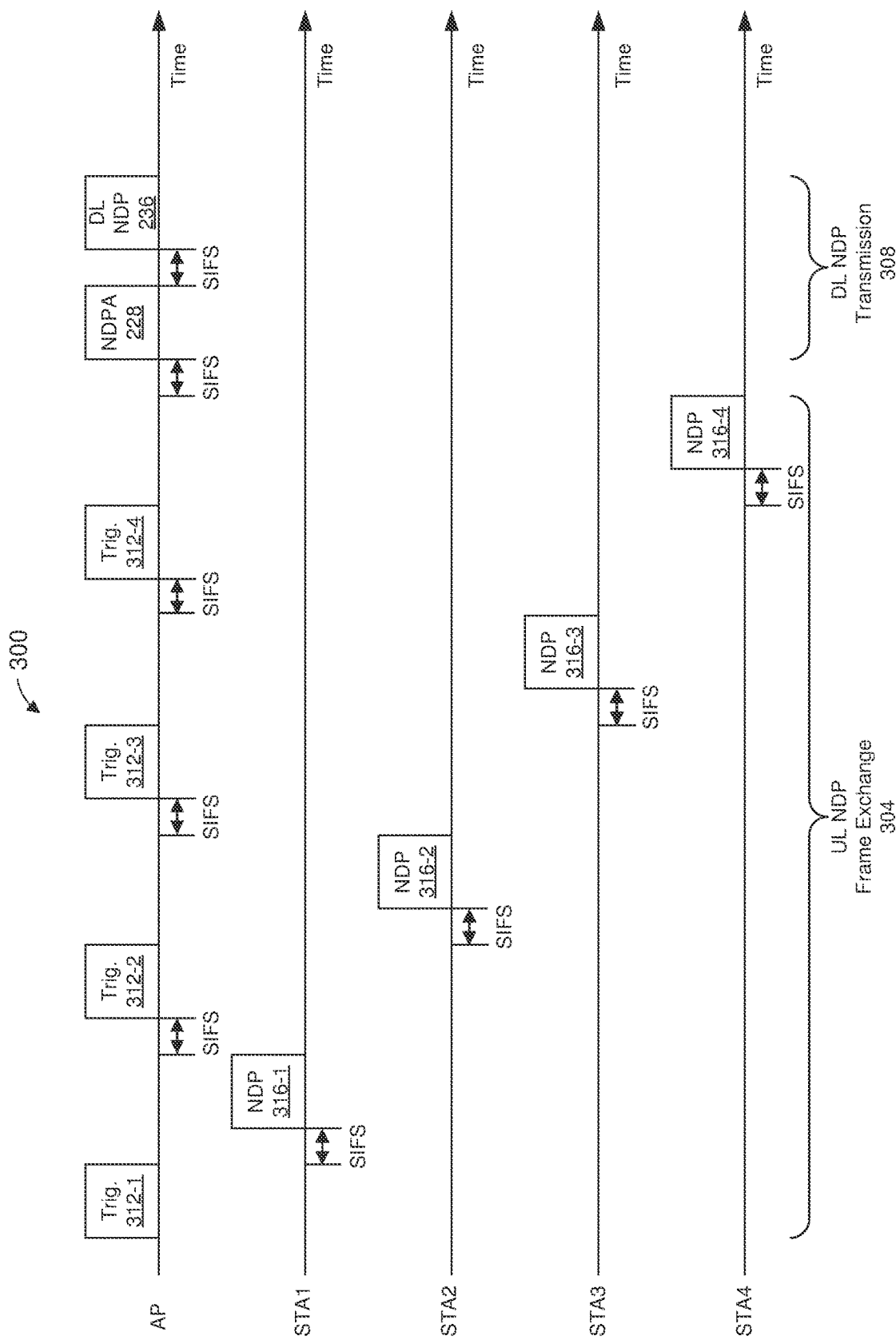
FIG. 3 is a diagram of another example MU ranging measurement exchange, according to another embodiment.

FIG. 3 is a diagram of a portion 300 of another example MU ranging measurement exchange in an MU ranging measurement procedure, according to another embodiment. FIG. 3 is described in the context of the example network 110 merely for explanatory purposes. In some embodiments, signals illustrated in FIG. 3 are generated by other suitable communication devices in other suitable types of wireless networks.

The portion 300 of the MU ranging measurement exchange corresponds to an AP-initiated MU ranging measurement exchange (referred to herein as "the MU ranging measurement exchange 300" for ease of reference), according to an embodiment. The MU ranging measurement exchange 300 also includes a station readiness poll portion and a feedback exchange portion, which are not shown in FIG. 3. For example, the MU ranging measurement exchange 300 also includes a DL FB exchange (e.g., the DL FB exchange 210 or another suitable DL FB exchange), and/or are UL FB exchange (e.g., the DL FB exchange 210 or another suitable DL FB exchange), both of which are not shown in FIG. 3.

The MU ranging measurement exchange 300 includes the DL PPDU 228 and the DL PPDU 232 discussed with reference to FIG. 2A. The DL PPDU 228 and the DL PPDU 232 are not discussed in detail again for purposes of brevity.

The MU ranging measurement exchange 300 includes an UL NDP frame exchange 304, and a DL NDP transmission portion 308. In an embodiment, the uplink UL NDP frame exchange 304 and the DL NDP transmission portion 308 occur within a single TXOP.

In the UL NDP exchange 304, an AP (e.g., the AP 114) transmits multiple DL PPDUs 312 that include respective trigger frames to cause a group of multiple client stations 154 (e.g., STA1, STA2, STA3, STA4) to transmit multiple UL NDPs 316. In an embodiment, the trigger frames in the PPDUs 312 are a type of trigger frame specifically for prompting a client station to transmit UL NDP as part of a MU ranging measurement exchange. The respective trigger frame in the respective PPDU 312 causes the respective client station 154 to begin transmitting the respective UL NDP 316 a defined time period after an end of the PPDU 312. In an embodiment, the defined time period is SIRS as defined by the IEEE 802.11 Standard. In other embodiments, another suitable time period is utilized. In an embodiment, the AP 114 transmits a subsequent PPDU 312 a defined time period after an end of reception of the previous PPDU 312. In an embodiment, the defined time period is SIFS as defined by the IEEE 802.11 Standard. In other embodiments, another suitable time period is utilized.

Although FIG. 3 illustrates only one client station transmitting in response to each trigger frame 312, in other embodiments a respective set of multiple client stations transmit in UL MU transmission(s) in response to each of one or more of the trigger frames 312. In an embodiment, the AP 114 selects a set of multiple client stations to transmit NDPs 316 in response to a single trigger frame 312 such that the receive power of the multiple NPDs 3116 at the AP 114 is within a suitable range. The AP 114 prompts client stations corresponding to significantly different receive power at the AP 114 (e.g., not within the suitable range) to transmit NDPs 316 at different times with different trigger frames 312.

The multiple UL NDPs 316 are transmitted within a same frequency band. In another embodiment, at least two UL NDPs 316 are transmitted in different respective frequency bandwidth portions. The UL NDPs 3116 include PHY preambles having one or more STFs, one or more LTFs, and one or more signal fields, in an embodiment. In an embodiment, each UL NDP 316 includes i) a legacy portion having an L-STF, an L-LTF, and an L-SIG, and ii) a non-legacy portion having an HE-STF, one or more HE-LTFs, and an HE-SIG. The UL NDPs 316 omit data portions.

When a client station 154 transmits the UL NDP 316, the client station 154 records a time $t_{1,k}$ at which the client station 154 began transmitting a particular portion of the UL NDP 316 (e.g., a first occurring HE-LTF in the UL NDP 316), where k is an index indicating the particular client station 154. Similarly, when the AP 114 receives each UL NDP 316, the AP 114 records a time at which the AP 114 began receiving the particular portion of the UL NDP 316 (e.g., the first occurring HE-LTF in the UL NDP 316).

In some embodiments, when the client station 154 transmits the UL NDP 316, the client station 154 records an angle of departure, $AoD_{1,k}$, at which the UL NDP 316 left the antennas 178 of the client station 154. Similarly, when the AP 114 receives the UL NDP 316, the AP 114 records an angle of arrival, $AoA_{1,k}$, at which the UL NDP 316 arrived at the antennas 138 of the AP 114, according to an embodiment.

Because the transmission of the UL NDPs 316 corresponding to significantly different receive power (e.g., not within a suitable range) at the AP 114 do not overlap in time and are received at the AP 114 at different times, degradation of ToA estimation(s) by the AP 114 caused by the near-far effect (discussed with reference to FIG. 2A) is avoided. For example, the AP 114 prompts client stations of different classes to transmit NPDs 316 at different times, in an embodiment. As another example, the AP 114 groups client stations 154 according to distance from the AP 114, and prompts client stations of at significantly different distances to transmit NPDs 316 at different times, in an embodiment.

In an embodiment, responsive to receiving a last UL NDP 316 (e.g., the UL NDP 316-4), the AP 114 begins transmitting the DL PPDU 228 that includes the NDPA frame a defined time period after an end of the last UL NDP 316 (e.g., the UL NDP 316-4). In an embodiment, the defined time period is SIFS. In other embodiments, another suitable time period is utilized. For example, the AP 114 begins transmitting the DL PPDU 228 after a point coordination function interframe space (PIFS) as defined by the IEEE 802.11 Standard, which is longer than SIFS, according to an embodiment. As another example, if the AP 114 does not receive an NDP 316 after SIFS, PIFS, or another suitable time period, the AP 114 performs a backoff procedure prior to transmitting the DL PPDU 228.

The AP 114 generates the DL PPDU 232 and begins transmitting the DL PPDU 232 a defined time period after an end of the DL PPDU 228. In an embodiment, the defined time period is SIFS. In other embodiments, another suitable time period is utilized.

Figure 4:
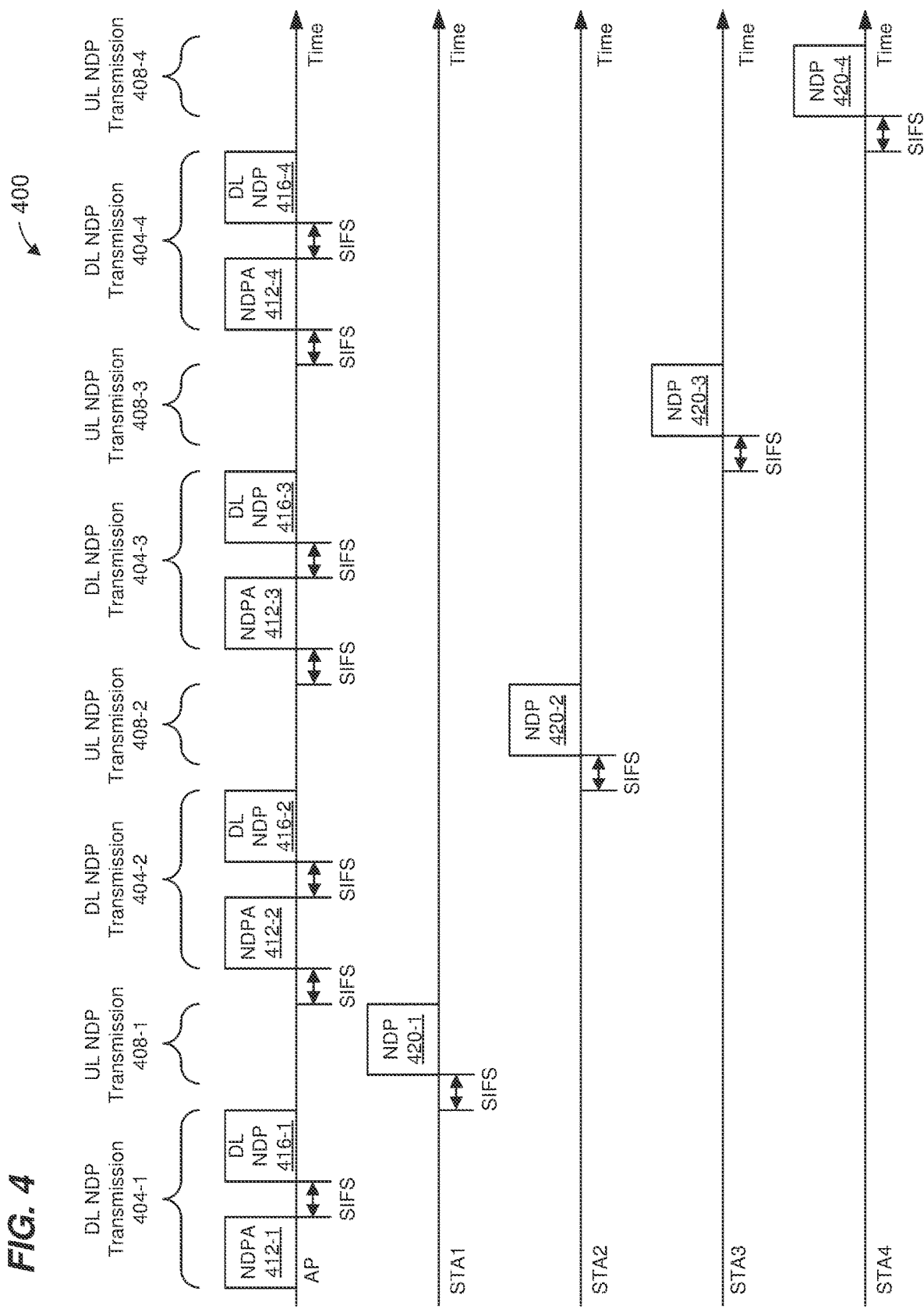
FIG. 4 is a diagram of another example MU ranging measurement exchange, according to another embodiment.

FIG. 4 is a diagram of a portion 400 of another example MU ranging measurement exchange in an MU ranging measurement procedure, according to another embodiment. FIG. 4 is described in the context of the example network 110 merely for explanatory purposes. In some embodiments, signals illustrated in FIG. 4 are generated by other suitable communication devices in other suitable types of wireless networks.

The portion 400 of the MU ranging measurement exchange corresponds to an AP-initiated MU ranging measurement exchange (referred to herein as "the MU ranging measurement exchange 400" for ease of reference), according to an embodiment. The MU ranging measurement exchange 400 also includes a station readiness polling portion and a feedback exchange portion, which are not shown in FIG. 4. For example, the MU ranging measurement exchange 400 also includes a DL FB exchange (e.g., the DL FB exchange 210 or another suitable DL FB exchange), and/or an UL FB exchange (e.g., the DL FB exchange 210 or another suitable DL FB exchange), both of which are not shown in FIG. 4.

The MU ranging measurement exchange 400 includes a plurality of DL NDP transmission portions 404, and a plurality of UL NDP transmission portions 408. In an embodiment, the plurality of DL NDP transmission portions 404, and the plurality of UL NDP transmission portions 408 occur within a single TXOP.

The AP 114 generates DL PPDUs 412, and during each DL NDP transmission portion 404, the AP 114 transmits the respective DL PPDU 412 that includes an NDPA frame. The DL PPDU 412 is an SU transmission to a respective client station 154, according to an embodiment. The NDPA frame in the PPDU 412 is configured to cause the respective client station 154 to be prepared to receive a respective NDP from the AP 114, according to an embodiment.

The AP 114 generates DL NDPs 416, and during each DL NDP transmission portion 404, the AP 114 transmits the respective DL NDP 416. In an embodiment, the AP begins transmitting the respective DL NDP 416 a defined time period after an end of the respective DL PPDU 412. In an embodiment, the defined time period is SIFS. In other embodiments, another suitable time period is utilized. Each DL NDP 416 is an SU transmission to a respective client station 154. Each DL NDP 416 includes a PHY preamble having one or more STFs, one or more LTFs and one or more signal fields, in an embodiment. In an embodiment, each DL NDP 416 includes i) a legacy portion having an L-STF, an L-LTF, and an L-SIG, and ii) a non-legacy portion having an HE-STF, one or more HE-LTFs, and one or more HE-SIGs. Each DL NDP 416 omits a data portion.

When transmitting each DL NDP 416, the AP 114 records a time $t_{3,k}$ at which the AP 114 began transmitting a particular portion of the DL NDP 416 (e.g., a first occurring HE-LTF in the DL NDP 416). Similarly, when each client station 154 receives the corresponding DL NDP 416, the client station 154 records a time $t_{4,k}$ at which the client station 154 began receiving the particular portion of the DL NDP 416 (e.g., the first occurring HE-LTF in the DL NDP 236).

In some embodiments, when transmitting the DL NDP 416, the AP 114 records an $AoD_{2,k}$ at which the DL NDP 416 left the antennas 138 of the AP 114. Similarly, when the client station 154 receives the DL NDP 416, the client station 154 records an $AoA_{2,k}$ at which the DL NDP 416 arrived at the antennas 178 of the client station 154.

In each UL NDP transmission portion 408, the respective client station 154 transmits a respective UL NDP 420. In an embodiment, each client station 154 is configured to transmit the respective UL NDP 420 in response to receiving the respective DL NDP 416. In an embodiment, each client station 154 is configured to transmit the respective UL NDP 420 a defined time period after an end of the respective DL NDP 416. In an embodiment, the defined time period is SIPS as defined by the IEEE 802.11 Standard. In other embodiments, another suitable time period is utilized.

In a DL NDP transmission portion 404 that follows an UL NDP transmission portion 408, the AP 114 transmits the respective PPDU 412 a defined time period after an end of reception of the previous UL NPD 420. In an embodiment, the defined time period is SIFS as defined by the IEEE 802.11 Standard. In other embodiments, another suitable time period is utilized.

The multiple UL NDPs 420 are transmitted within a same frequency band. In another embodiment, at least two UL NDPs 420 are transmitted in different respective frequency bandwidth portions. The UL NDPs 420 include PHY preambles having one or more STFs, one or more LTFs, and one or more signal fields, in an embodiment. In an embodiment, each UL NDP 420 includes i) a legacy portion having an L-STF, an L-LTF, and an L-SIG, and ii) a non-legacy portion having an HE-STF, one or more HE-LTFs, and an HE-SIG. The UL NDPs 420 omit data portions.

When a client station 154 transmits the UL NDP 420, the client station 154 records a time $t_{1,k}$ at which the client station 154 began transmitting a particular portion of the UL NDP 420 (e.g., a first occurring HE-LTF in the UL NDP 420), where k is an index indicating the particular client station 154. Similarly, when the AP 114 receives each UL NDP 420, the AP 114 records a time $t_{2,k}$ at which the AP 114 began receiving the particular portion of the UL NDP 420 (e.g., the first occurring HE-LTF in the UL NDP 420).

In some embodiments, when the client station 154 transmits the UL NDP 420, the client station 154 records an angle of departure, $AoD_{1,k}$, at which the UL NDP 420 left the antennas 178 of the client station 154. Similarly, when the AP 114 receives the UL NDP 420, the AP 114 records an angle of arrival, $AoA_{1,k}$, at which the UL NDP 420 arrived at the antennas 138 of the AP 114, according to an embodiment.

Because the transmission of the UL NDPs 420 do not overlap in time and are received at the AP 114 at different times, degradation of ToA estimation(s) by the AP 114 caused by the near-far effect (discussed with reference to FIG. 2A) is avoided.

Figure 5:
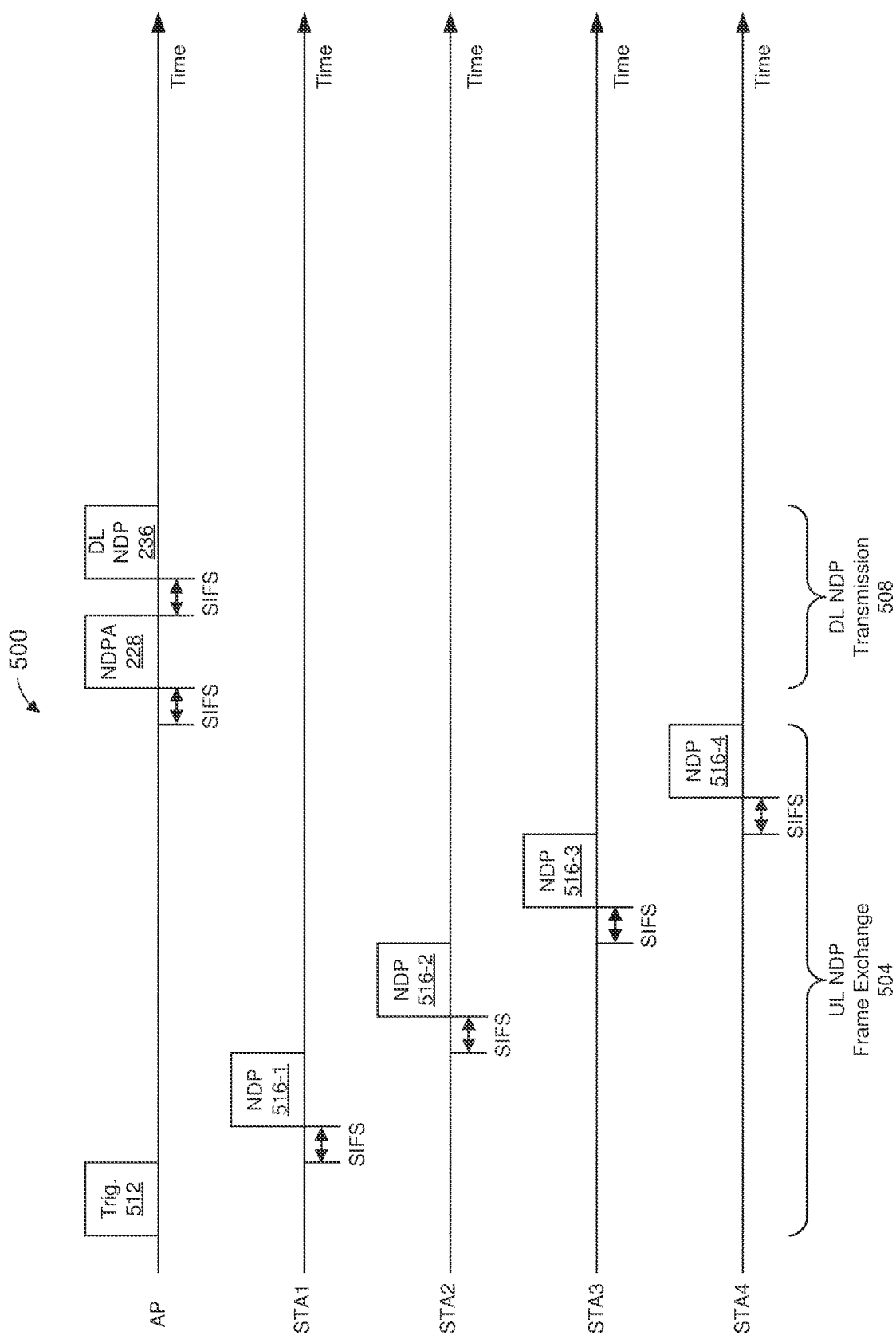
FIG. 5 is a diagram of another example MU ranging measurement exchange, according to another embodiment.

FIG. 5 is a diagram of a portion 500 of another example MU ranging measurement exchange in an MU ranging measurement procedure, according to another embodiment. FIG. 5 is described in the context of the example network 110 merely for explanatory purposes. In some embodiments, signals illustrated in FIG. 5 are generated by other suitable communication devices in other suitable types of wireless networks.

The portion 500 of the MU ranging measurement exchange corresponds to an AP-initiated MU ranging measurement exchange (referred to herein as "the MU ranging measurement exchange 500" for ease of reference), according to an embodiment. The MU ranging measurement exchange 500 also includes a station readiness polling portion, a feedback exchange portion, which is not shown in FIG. 5. For example, the MU ranging measurement exchange 500 also includes a DL FB exchange (e.g., the DL FB exchange 210 or another suitable DL FB exchange), and/or an UL FB exchange (e.g., the DL FB exchange 210 or another suitable DL FB exchange), both of which are not shown in FIG. 5.

The MU ranging measurement exchange 500 includes the DL PPDU 228 and the DL PPDU 232 discussed with reference to FIG. 2A. The DL PPDU 228 and the DL PPDU 232 are not discussed in detail again for purposes of brevity.

The MU ranging measurement exchange 500 includes an UL NDP frame exchange 504, and a DL NDP transmission portion 508. In an embodiment, the uplink UL NDP frame exchange 504 and the DL NDP transmission portion 508 occur within a single TXOP.

In the UL NDP exchange 504, an AP (e.g., the AP 114) transmits a DL PPDU 512 that includes a trigger frame configured to cause a group of multiple client stations 154 (e.g., STA1, STA2, STA3, STA4) to transmit multiple UL NDPs 516. In an embodiment, the trigger frame in the PPDU 512 is a type of trigger frame specifically for prompting a client station to transmit an UL NDP as part of a MU ranging measurement exchange.

The trigger frame in the PPDU 512 includes information indicating an order, in time, in which client stations 154 in the group are to transmit UL NDPs 516, according to an embodiment. The trigger frame in the PPDU 512 is configured to prompt a first client station 154 (e.g., STA1) to begin transmitting the UL NDP 516-1 a defined time period after an end of the PPDU 512. In an embodiment, the defined time period is SIRS as defined by the IEEE 802.11 Standard. In other embodiments, another suitable time period is utilized.

Each remaining client station 154 in the group is configured to begin transmitting the respective UL NDP 516 a defined time period after an end of the previously transmitted UL NDP 516. In an embodiment, the defined time period is SIFS as defined by the IEEE 802.11 Standard. In other embodiments, another suitable time period is utilized.

The multiple UL NDPs 516 are transmitted within a same frequency band. In another embodiment, at least two UL NDPs 516 are transmitted in different respective frequency bandwidth portions. The UL NDPs 516 include PHY preambles having one or more STFs, one or more LTFs, and one or more signal fields, in an embodiment. In an embodiment, each UL NDP 516 includes i) a legacy portion having an L-STF, L-LTF, and an L-SIG, and ii) a non-legacy portion having an HE-STF, one or more HE-LTFs, and an HE-SIG. The UL NDPs 516 omit data portions.

Although FIG. 5 illustrates only one client station 154 transmitting at a time, in other embodiments a respective set of multiple client stations transmit NDPs 516 in UL MU transmission(s). In an embodiment, the AP 114 selects a set of multiple client stations to transmit NDPs 516 simultaneously such that the receive power of the multiple NPDs 516 at the AP 114 is within a suitable range. The AP 114 prompts client stations corresponding to significantly different receive power at the AP 114 (e.g., not within the suitable range) to transmit NDPs 516 at different times.

When a client station 154 transmits the UL NDP 516, the client station 154 records a time $t_{1,k}$ at which the client station 154 began transmitting a particular portion of the UL NDP 516 (e.g., a first occurring HE-LTF in the UL NDP 316), where k is an index indicating the particular client station 154. Similarly, when the AP 114 receives each UL NDP 516, the AP 114 records a time $t_{2,k}$ at which the AP 114 began receiving the particular portion of the UL NDP 516 (e.g., the first occurring HE-LTF in the UL NDP 316).

In some embodiments, when the client station 154 transmits the UL NDP 516, the client station 154 records an angle of departure, $AoD_{1,k}$, at which the UL NDP 516 left the antennas 178 of the client station 1154. Similarly, when the AP 114 receives the UL NDP 516, the AP 114 records an angle of arrival, $AoA_{1,k}$, at which the UL NDP 516 arrived at the antennas 138 of the AP 114, according to an embodiment.

Because the transmission of the UL NDPs 516 corresponding to significantly different receive power (e.g., not within a suitable range) at the AP 114 do not overlap in time and are received at the AP 114 at different times, degradation of ToA estimation(s) by the AP 114 caused by the near-far effect (discussed with reference to FIG. 2A) is avoided. For example, the AP 114 prompts client stations of different classes to transmit NPDs 516 at different times, in an embodiment. As another example, the AP 114 groups client stations 154 according to distance from the AP 114, and prompts client stations of at significantly different distances to transmit NPDs 516 at different times, in an embodiment.

In an embodiment, responsive to receiving a last UL NDP(s) 516 (e.g., the UL NDP 516-4), the AP 114 begins transmitting the DL PPDU 228 that includes the NDPA frame a defined time period after an end of the last UL NDP 516 (e.g., the UL NDP 516-4). In an embodiment, the defined time period is SIFS. In other embodiments, another suitable time period is utilized. For example, the AP 114 begins transmitting the DL PPDU 228 after PIFS, according to an embodiment. As another example, if the AP 114 does not receive the last UL NDP(s) 516 after SIFS, PIFS, or another suitable time period, the AP 114 performs a backoff procedure prior to transmitting the DL PPDU 228.

The AP 114 generates the DL PPDU 232 and begins transmitting the DL PPDU 232 a defined time period after an end of the DL PPDU 228. In an embodiment, the defined time period is SIFS. In other embodiments, another suitable time period is utilized.

Figure 6:
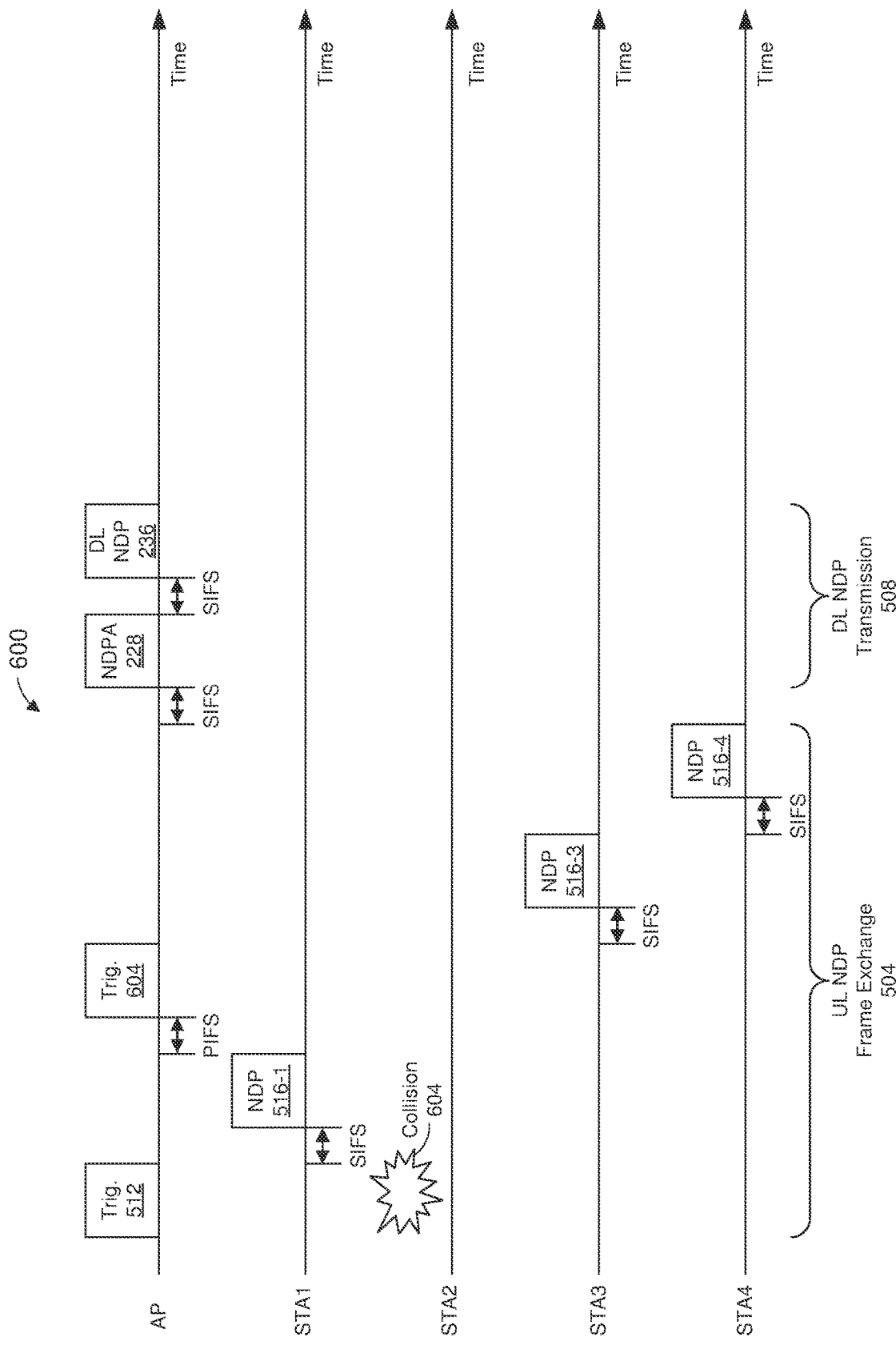
FIG. 6 is a diagram of an example MU ranging measurement exchange similar to the MU ranging measurement exchange of FIG. 5, illustrating a scenario in which a null data packet (NDP) is not received as a result of a collision, according to another embodiment.

In some situations, a client station 154 may not correctly receive the DL PPDU 512 (which includes the trigger frame), and thus the client station 154 does not transmit the respective UL NDP 516, FIG. 6 is a diagram of the example MU ranging measurement exchange 500 of FIG. 5, but in which STA2 does not receive the DL PPDU 512 (which includes the trigger frame) because of a collision 604.

The AP 114 waits a suitable time period after receiving the UL NDP 516-1 to begin receiving the UL NDP 516-2 from STA2. In an embodiment, the suitable time period is PIFS. In another embodiment, the time period is another suitable time period other than PIFS.

In the scenario, the AP 114 does not begin receiving the UL NDP 516-2 from STA2 within the suitable time period. As a result, the AP 114 generates a DL PPDU 604 having another trigger frame 604 and transmits the DL PPDU 604. The trigger frame in the DL PPDU 604 is configured to prompt the remaining client stations 154 (e.g., STA3 and STA4) to transmit their respective UL NDPs 516.

In an embodiment, the AP 114 is configured to generate and transmit the DL PPDU 604 such that the DL PPDU 604 ends at approximately a time at which the UL NDP 516-2 from STA2 would have ended if STA2 had transmitted the UL NDP 516-2. As a result, the times at which the UL NDP 516-3 and the UL NDP 516-4 are transmitted is the approximately the same as the times at which the UL NDP 516-3 and the UL NDP 516-4 would have been transmitted if STA2 had transmitted the UL NDP 516-2. In an embodiment, the AP 114 uses a first modulation and coding scheme (MCS) when transmitting the DL PPDU 604 which is different than a second MCS the AP 114 used when transmitting the DL PPDU 512. In an embodiment, the AP 114 chooses the first MCS from among a plurality of MCSs to adjust a duration of the DL PPDU 604 in an attempt to make an end of the transmission of the DL PPDU 604 occur at approximately a time at which the UL NDP 516-2 from STA2 would have ended if STA2 had transmitted the UL NDP 516-2. In an embodiment, the AP 114 adds padding (e.g., PHY padding and/or MAC padding) to a data portion of the DL PPDU 604 to adjust a duration of the DL PPDU 604 in an attempt to make an end of the transmission of the DL PPDU 604 occur at approximately a time at which the UL NDP 516-2 from STA2 would have ended if STA2 had transmitted the UL NDP 516-2. In an embodiment, the AP 114 i) chooses the first MCS, and ii) adds padding to the data portion of the DL PPDU 604, in an attempt to make an end of the transmission of the DL PPDU 604 occur at approximately a time at which the UL NDP 516-2 from STA2 would have ended if STA2 had transmitted the UL NDP 516-2. Additionally or alternatively, the AP 114 adjusts a start transmission time of the DL PPDU 604 in an attempt to make an end of the transmission of the DL PPDU 604 occur at approximately a time at which the UL NDP 516-2 from STA2 would have ended if STA2 had transmitted the UL NDP 516-2, according to some embodiments.

Figure 7:
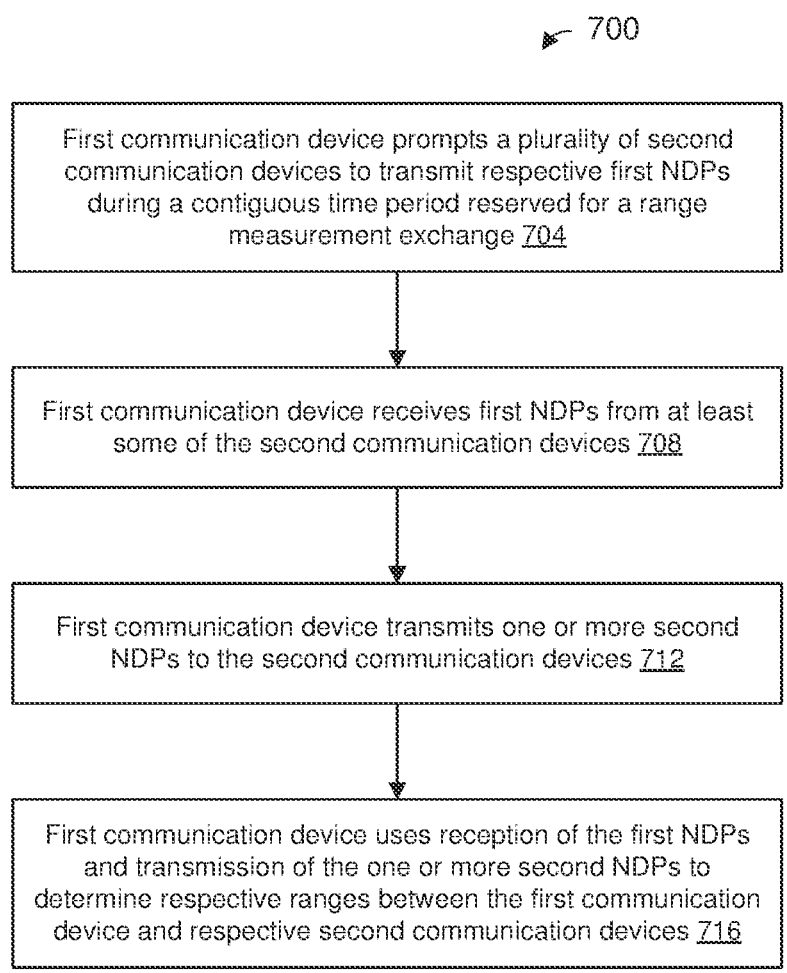
FIG. 7 is a flow diagram of an example method for performing a ranging measurement procedure, according to an embodiment.

FIG. 7 is a flow diagram of an example method 700 for performing a ranging measurement procedure, according to an embodiment. In some embodiments, the network interface device 122 of FIG. 1 is configured to implement the method 700. For ease of explanation, the method 700 is described in the context of the network interface device 122 implementing the method 700. In other embodiments, however, the method 700 is implemented by another suitable communication device.

At block 704, a first communication device prompts (e.g., the network interface device 122 prompts) a plurality of second communication devices (e.g., client stations 154) to transmit, during a contiguous time period reserved for a range measurement exchange, respective first NDPs at respective times. In an embodiment, the contiguous time period is reserved for an MU ranging measurement exchange. In an embodiment the MU ranging measurement exchange is an exchange of packets between at least three communication devices (e.g., the first communication device and at least two second communication devices).

In an embodiment, the AP 114 selects (e.g., the network interface device 122 selects) a set of multiple client stations to transmit NDPs simultaneously such that the receive power of the multiple NPDs at the AP 114 is within a suitable range. The AP 114 prompts client stations corresponding to significantly different receive power at the AP 114 (e.g., not within the suitable range) to transmit NDPs at different times.

In an embodiment, block 704 includes transmitting, by the first communication device, a plurality of packets that include respective trigger frames, wherein the packets that include respective trigger frames are transmitted at respective times, and wherein each trigger frame is configured to prompt a respective set of one or more second communication devices to transmit the respective first NDP(s). For example, with reference to FIG. 3, the AP 114 transmits a plurality of packets 312, each including a respective trigger frame, wherein each trigger frame is configured to prompt a respective set of one or more client stations 154 to transmit a respective NDP(s) 316 to the AP 114.

In another embodiment, block 704 includes transmitting, by the first communication device, packets that include respective NDPA frames, wherein the packets that include the respective NDPA frames are transmitted at respective times, and wherein each NDPA frame is configured to: i) announce transmission of a respective second NDP by the first communication device, and prompt the respective set of one or more second communication devices to transmit the respective first NDP(s). For example, with reference to FIG. 4, the AP 114 transmits a plurality of packets 412, each including a respective NDPA frame, wherein each NDPA frame is configured to prompt a respective set of one or more client stations 154 to transmit a respective NDP(s) 420 to the AP 114.

In yet another embodiment, block 704 includes transmitting, by the first communication device, a packet with a trigger frame that is configured to prompt the plurality of second communication devices to transmit the respective first NDPs at respective times. For example, with reference to FIG. 5, the AP 114 transmits the packet 512, which includes a trigger frame that is configured to prompt the plurality of client stations 154 to transmit respective first NDPs 516 at respective times.

At block 708, the first communication device receives (e.g., the network interface device 122 receives, the PHY processor 130 receives, etc.) first NDPs from at least some of the second communication devices (e.g., client stations 154) during the contiguous time period. The first NDPs received at block 708 are transmitted by the at least some second communication devices in response to the prompting at block 704.

For example, with reference to FIG. 3, the AP 114 receives at least some of the NDPs 316, according to an embodiment. As another example, with reference to FIG. 4, the AP 114 receives at least some of the NDPs 420, according to another embodiment. As another example, with reference to FIG. 5, the AP 114 receives at least some of the NDPs 516, according to another embodiment.

In an embodiment in which block 704 includes transmitting a packet with a trigger frame that is configured to prompt the plurality of second communication devices to transmit the respective first NDPs at respective times, the method 700 further comprises: in response to determining, at the first communication device (e.g., at the network interface device 122, at the MAC processor 126, etc.), that one of the second communication devices did not begin transmitting the respective first NDP within a predetermined time period, the first communication device transmits (e.g., the network interface device 122 transmits, the PHY processor 130 transmits, etc.), a further packet with a further trigger frame that is configured to prompt one or more remaining second communication devices to transmit, respective first NDPs at respective times.

At block 712, the first communication device transmits (e.g., the network interface device 122 transmits, the PHY processor 130 transmits, etc.) one or more second NDPs to the second communication devices (e.g., client stations 154) during the contiguous time period.

For example, with reference to FIGS. 3 and 5, the AP 114 transmits the NDP 236, according to an embodiment. The method 700 further comprises transmitting (e.g., the first communication device transmits, the network interface device 122 transmits, the PHY processor 130 transmits, etc.) a packet having an NDPA frame (e.g., the packet 228) prior to transmitting the NDP 236, according to an embodiment.

As another example, with reference to FIG. 4, the AP 114 transmits the NDPs 416, according to an embodiment. The method 700 further comprises transmitting (e.g., the first communication device transmits, the network interface device 122 transmits, the PHY processor 130 transmits, etc.) a respective packet having an NDPA frame (e.g., the packets 412) prior to transmitting each NDP 416, according to an embodiment.

At block 716, the first communication device uses (e.g., the network interface device 122 uses, the MAC processor 126 uses, etc.) reception of the first NDPs and transmission of the one or more second NDPs to determine respective ranges between the first communication device and respective second communication devices. For example, the network interface device 122 uses (e.g., the MAC processor 126 uses) i) recorded times of reception of the first NDPs, ii) recorded time(s) of transmission of the second NDP(s), and range measurement feedback from the at least some of the second communication devices to determine respective ranges between the first communication device and the at least some of the second communication devices, according to an embodiment.

Figure 8:
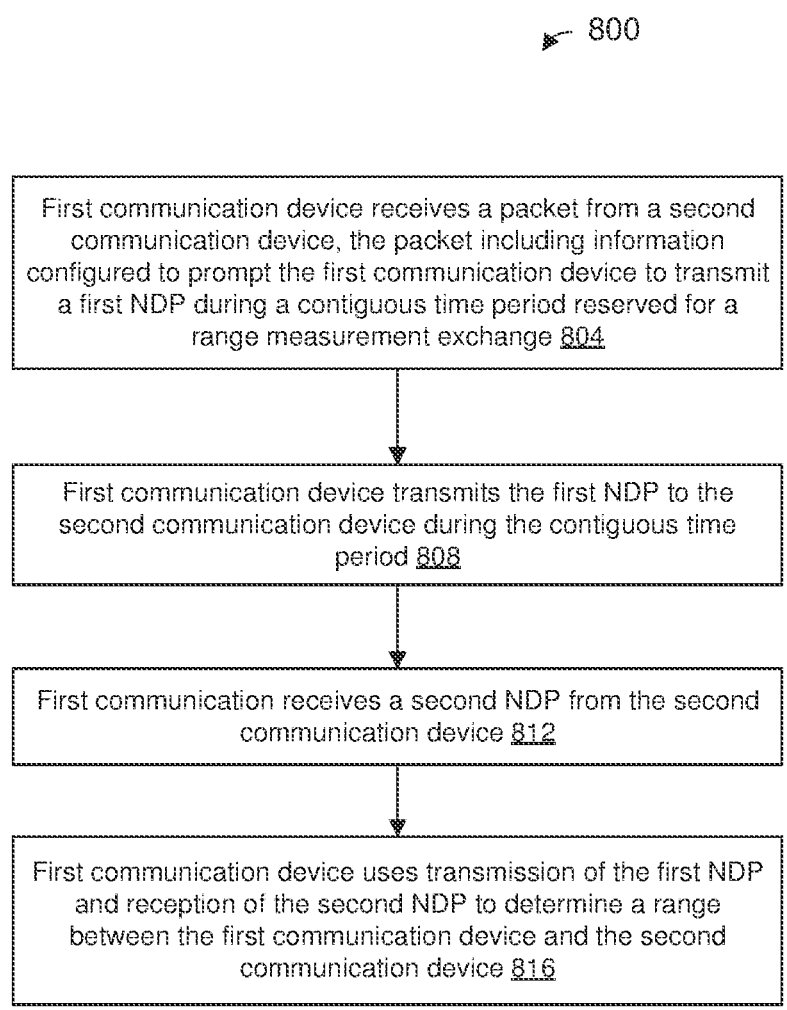
FIG. 8 is a flow diagram of another example method for performing a ranging measurement procedure, according to another embodiment.

FIG. 8 is a flow diagram of another example method 800 for performing a ranging measurement procedure, according to an embodiment. In some embodiments, the network interface device 162 of FIG. 11 is configured to implement the method 800. For ease of explanation, the method 800 is described in the context of the network interface device 162 implementing the method 800. In other embodiments, however, the method 800 is implemented by another suitable communication device.

At block 804, a first communication device receives a packet from a second communication device, the packet including information configured to prompt the first communication device to transmit a first NDP during a contiguous time period reserved for a range measurement exchange involving the first communication, the second communication device, and one or more other communication devices. In an embodiment, the contiguous time period is reserved for an MU ranging measurement exchange. In embodiment the MU ranging measurement exchange is an exchange of packets between at least three communication devices (e.g., the first communication, the device, and one or more other communication devices).

In an embodiment, the packet received at block 804 i) includes a trigger frame, and ii) is one packet among a plurality of packets that include respective trigger frames; the packets that include respective trigger frames are transmitted by the second communication device at respective times; each trigger frame is configured to prompt a respective set of one or more communication devices in a group of communication devices to transmit a respective NDP(s); and the group includes the first communication device and the one or more other communication devices. For example, with reference to FIG. 3, the AP 114 transmits a plurality of packets 312, each including a respective trigger frame, wherein each trigger frame is configured to prompt a respective set of one or more client stations 154 to transmit a respective NDP(s) 316 to the AP 114.

In another embodiment, the packet received at block 804 i) includes an NDPA frame, and ii) is one packet among a plurality of packets that include respective NDPA frames; the packets that include respective NDPA frames are transmitted by the second communication device at respective times; each null data packet announcement frame is configured to: announce transmission of a respective second NDP by the second communication device, and prompt a respective set of one or more communication devices in the group of communication devices to transmit a respective NDP(s); and the group includes the first communication device and the one or more other communication devices.

For example, with reference to FIG. 4, the AP 114 transmits a plurality of packets 412, each including a respective NDPA frame, wherein each NDPA frame is configured to prompt a respective set of one or more client stations 154 to transmit a respective NDP(s) 420 to the AP 114.

In yet another embodiment, the packet received at block 804 includes a trigger frame that is configured to: i) prompt the first communication device (and one or more other first communication devices) to transmit the first NDP (simultaneously while the one or more other first communication devices transmit NDPs), and ii) prompt one or more other second communication devices to transmit the respective other NDPs at one or more other respective times. For example, with reference to FIG. 5, the AP 114 transmits the packet 512, which includes a trigger frame that is configured to prompt the plurality of client stations 154 to transmit respective first NDPs 516 at respective times.

In an embodiment in which block 804 includes receiving a packet with a trigger frame that is configured to i) prompt the first communication device to transmit the first NDP, and ii) prompt the one or more other second communication devices to transmit the respective other NDPs at one or more other respective times, the method 800 further comprises: receiving, at the first communication device, a further packet with a further trigger frame that is configured to prompt the first communication device to transmit the first NDP; wherein the further packet is received during a time period in which one of the other second communication devices was expected to transmit another NDP to the second communication device.

At block 808, the first communication device transmits (e.g., the network interface device 162 transmits, the PHY processor 170 transmits, etc.) the first NDP to the second communication device during the contiguous time period. In an embodiment, the first communication device transmits the first NDP in response to receiving the packet at block

804. In another embodiment, the first communication device transmits the first NDP in response to receiving the further packet with the further trigger frame.

For example, with reference to FIG. 3, STA3 transmits the NDP 316-3 in response to receiving the packet 312-3, according to an embodiment, As another example, with reference to FIG. 4, STA3 transmits the NDP 420-3 in response to receiving the packet 412-3, according to another embodiment. As another example, with reference to FIG. 5, STA3 transmits the NDP 516-3 in response to receiving the packet 512, according to another embodiment. As another example, with reference to FIG. 6, STA3 transmits the NDP 516-3 in response to receiving the packet 604, according to another embodiment.

At block 812, the first communication device receives (e.g., the network interface device 162 receives, the PHY processor 170 receives, etc.) a second NDP from the second communication device (e.g., the AP 114) during the contiguous time period.

For example, with reference to FIGS. 3 and 5, STA3 receives the NDP 236, according to an embodiment. The method 800 further comprises receiving (e.g., the first communication device receives, the network interface device 162 receives, the PHY processor 170 receives, etc.) a packet having an NDPA frame (e.g., the packet 228) prior to receiving the NDP 236, according to an embodiment.

As another example, with reference to FIG. 4, STA3 receives NDP 416-3, according to an embodiment. The method 800 further comprises receiving (e.g., the first communication device receives, the network interface device 162 receives, the PHY processor 170 receives, etc.) the packet 412-3 prior to receiving the NDP 416-3, according to an embodiment.

At block 816, the first communication device uses (e.g., the network interface device 162 uses, the MAC processor 166 uses, etc.) transmission of the first NDP and reception of the second NDP to determine a range between the first communication device and the second communication device. For example, the network interface device 162 uses (e.g., the MAC processor 166 uses) i) a recorded time of transmission of the first NDP, ii) a recorded time of reception of the second NDP, and range measurement feedback from the second communication device to determine a range between the first communication device and the second communication device, according to an embodiment.

In another embodiment, block 816 is omitted, and the method further includes transmitting, by the first communication device (e.g., the network interface device 162 transmits, the PHY processor 170 transmits, etc.) range measurement feedback to the second communication device so that the second communication device can determine the range between the first communication device and the second communication device. In an embodiment, in which the method further includes transmitting, by the first communication device, the range measurement feedback to the second communication device, block 816 is omitted.

Embodiment 1: A method for performing a ranging measurement procedure, the method comprising: prompting, at a first communication device, a plurality of second communication devices to transmit, during a contiguous time period reserved for a range measurement exchange, respective first null data packets (NDPs) at respective times; receiving, at the first communication device, first NDPs from at least some of the second communication devices during the contiguous time period; transmitting, by the first communication device, one or more second NDPs to the plurality of second communication devices; and using, at the first communication device, reception of the first NDPs and transmission of the one or more second NDPs to determine respective ranges between the first communication device and respective second communication devices.

Embodiment 2: The method of Embodiment 1, wherein prompting the plurality of second communication devices to transmit the respective first NDPs comprises: transmitting, by the first communication device, a plurality of packets that include respective trigger frames, wherein the packets that include respective trigger frames are transmitted at respective times, and wherein each trigger frame is configured to prompt a respective set of one or more second communication devices to transmit one or more respective first NDPs.

Embodiment 3: The method of Embodiment 1, wherein prompting the plurality of second communication devices to transmit the respective first NDPs comprises: transmitting, by the first communication device, packets that include respective null data packet announcement frames, wherein the packets that include respective null data packet announcement frames are transmitted at respective times, and wherein each null data packet announcement frame is configured to: announce transmission of a respective second NDP by the first communication device, and prompt a respective set of one or more second communication devices to transmit a respective set of one or more first NDPs; wherein transmitting the one or more second NDPs to the plurality of second communication devices comprises transmitting a respective second NDP after transmission of each packet that includes the respective null data packet announcement frame.

Embodiment 4: The method of Embodiment 1, wherein prompting the plurality of second communication devices to transmit the respective first NDPs comprises: transmitting, by the first communication device, a packet with a trigger frame that is configured to prompt the plurality of second communication devices to transmit the respective first NDPs at respective times.

Embodiment 5: The method of Embodiment 4, further comprising: in response to determining, at the first communication device, that one of the second communication devices did not begin transmitting the respective first NDP within a predetermined time period, transmitting, by the first communication device, a further packet with a further trigger frame that is configured to prompt one or more remaining second communication devices to transmit respective first NDPs at respective times.

Embodiment 6: An apparatus, comprising: a network interface device associated with a first communication device, wherein the network interface device is implemented on one or more integrated circuit (IC) devices, and wherein the network interface device is configured to: prompt a plurality of second communication devices to transmit, during a contiguous time period reserved for a range measurement exchange, respective first null data packets (NDPs) at respective times, receive first NDPs from at least some of the second communication devices during the contiguous time period, transmit one or more second NDPs to the plurality of second communication devices, and use reception of the first NDPs and transmission of the one or more second NDPs to determine respective ranges between the first communication device and respective second communication devices.

Embodiment 7: The apparatus of Embodiment 6, wherein the network interface device is configured to: transmit a plurality of packets that include respective trigger frames, wherein the packets that include respective trigger frames are transmitted at respective times, and wherein each trigger frame is configured to prompt a respective set of one or more second communication devices to transmit one or more respective first NDPs.

Embodiment 8: The apparatus of Embodiment 6, wherein the network interface device is configured to: transmit packets that include respective null data packet announcement (NDPA) frames, wherein the packets that include respective NDPA frames are transmitted at respective times, and wherein each NDPA frame is configured to: announce transmission of a respective second NDP by the first communication device, and prompt a respective set of one or more second communication devices to transmit a respective set of one or more first NDPs. The network interface device is configured to: transmit a respective second NDP after transmission of each packet that includes the respective NDPA frame.

Embodiment 9: The apparatus of Embodiment 6, wherein the network interface device is configured to: transmit a packet with a trigger frame that is configured to prompt the plurality of second communication devices to transmit the respective first NDPs at respective times.

Embodiment 10: The apparatus of Embodiment 9, wherein the network interface device is configured to: in response to determining, at the network interface device, that one of the second communication devices did not begin transmitting the respective first NDP within a predetermined time period, transmit a further packet with a further trigger frame that is configured to prompt one or more remaining second communication devices to transmit respective first NDPs at respective times.

Embodiment 11: A method for performing a ranging measurement procedure, the method comprising: receiving, at a first communication device, a packet from a second communication device, the packet including information configured to prompt the first communication device to transmit a first null data packet (NDP) during a contiguous time period reserved for a range measurement exchange involving the first communication, the second communication device, and one or more other communication devices; responsive to receiving the packet, transmitting, by the first communication device, the first NDP to the second communication device during the contiguous time period; receiving, by the first communication device, a second NDP from the second communication during the contiguous time period; and using, at the first communication device, transmission of the first NDP and reception of the second NDP to determine a range between the first communication device and the second communication device.

Embodiment 12: The method of Embodiment 11, wherein: the packet that includes the information configured to prompt the first communication device to transmit the first NDP during the contiguous time period i) includes a trigger frame, and ii) is one packet among a plurality of packets that include respective trigger frames; the packets that include respective trigger frames are transmitted by the second communication device at respective times; each trigger frame is configured to prompt a respective set of one or more communication devices in a group of communication devices to transmit a respective set of one or more NDPs; and the group includes the first communication device and the one or more other communication devices.

Embodiment 13: The method of Embodiment 11, wherein: the packet that includes the information configured to prompt the first communication device to transmit the first NDP during the contiguous time period i) includes a null data packet announcement (NDPA) frame, and ii) is one packet among a plurality of packets that include respective NDPA frames; the packets that include respective NDPA frames are transmitted by the second communication device at respective times; each null data packet announcement frame is configured to: announce transmission of a respective second NDP by the second communication device, and prompt a respective set of one or more communication devices in a group of communication devices to transmit a respective set of one or more NDPs; the group includes the first communication device and the one or more other communication devices; and the first communication device receives the second NDP from the second communication after receiving the one packet that includes the NDPA frame.

Embodiment 14: The method of Embodiment 11, wherein: the packet that includes information configured to prompt the first communication device to transmit the first NDP includes a trigger frame that is configured to: i) prompt the first communication device to transmit the first NDP, and ii) prompt at least some of the one or more communication devices to transmit respective other NDPs at one or more other respective times.

Embodiment 15: The method of Embodiment 14, further comprising: receiving, at the first communication device, a further packet with a further trigger frame that is configured to prompt the first communication device to transmit the first NDP; wherein the further packet is received during a time period in which one of the other communication devices was expected to transmit another NDP to the second communication device.

Embodiment 16: An apparatus, comprising: a network interface device associated with a first communication device, wherein the network interface device is implemented on one or more integrated circuit (IC) devices, and wherein the network interface device is configured to: receive a packet from a second communication device, the packet including information configured to prompt the first communication device to transmit a first null data packet (NDP) during a contiguous time period reserved for a range measurement exchange involving the first communication, the second communication device, and one or more other communication devices, responsive to receiving the packet, transmits the first NDP to the second communication device during the contiguous time period, receive a second NDP from the second communication during the contiguous time period, and use transmission of the first NDP and reception of the second NDP to determine a range between the first communication device and the second communication device.

Embodiment 17: The apparatus of Embodiment 16, wherein: the packet that includes the information configured to prompt the first communication device to transmit the first NDP during the contiguous time period i) includes a trigger frame, and ii) is one packet among a plurality of packets that include respective trigger frames; the packets that include respective trigger frames are transmitted by the second communication device at respective times; each trigger frame is configured to prompt a respective set of one or more communication devices in a group of communication devices to transmit a respective set of one or more NDPs; and the group includes the first communication device and the one or more other communication devices.

Embodiment 18: The apparatus of Embodiment 16, wherein: the packet that includes the information configured to prompt the first communication device to transmit the first NDP during the contiguous time period i) includes a null data packet announcement (NDPA) frame, and ii) is one packet among a plurality of packets that include respective NDPA frames; the packets that include respective NDPA frames are transmitted by the second communication device at respective times; each null data packet announcement frame is configured to: announce transmission of a respective second NDP by the second communication device, and prompt a respective set of one or more communication devices in a group of communication devices to transmit a respective set of one or more NDPs; the group includes the first communication device and the one or more other communication devices; and the first communication device receives the second NDP from the second communication after receiving the one packet that includes the NDPA frame.

Embodiment 19: The Embodiment of claim 16, wherein: the packet that includes information configured to prompt the first communication device to transmit the first NDP includes a trigger frame that is configured to: i) prompt the first communication device to transmit the first NDP, and ii) prompt at least some of the one or more communication devices to transmit respective other NDPs at one or more other respective times.

Embodiment 20: The apparatus of Embodiment 16, wherein: the network interface device is configured to receive a further packet with a further trigger frame that is configured to prompt the first communication device to transmit the first NDP; and wherein the further packet is received during a time period in which one of the other communication devices was expected to transmit other NDP to the second communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing a ranging measurement procedure, the method comprising:
   determining, by a first communication device, a plurality of second communication devices from a plurality of third communication devices to transmit first null data packets (NDPs);
   prompting, at a first communication device, the selected plurality of second communication devices to transmit, during a contiguous time period reserved for a range measurement exchange, the respective first NDPs at respective times, wherein remaining communication devices of the plurality of third communications are not prompted to transmit during the contiguous time period the first NDPs;
   receiving, at the first communication device, the first NDPs from at least some of the selected second communication devices during the contiguous time period, wherein the first NDPs are received at a respective receive power within the receive power range;
   transmitting, by the first communication device, one or more second NDPs to the selected plurality of second communication devices; and
   using, at the first communication device, reception of the first NDPs to determine respective ranges between the first communication device and respective selected second communication devices.

2. The method of claim 1 wherein the using includes using the transmission of the one or more second NDPs to determine respective ranges between the first communication device and respective selected second communication devices.

3. The method of claim 1, wherein prompting the selected plurality of second communication devices to transmit the respective first NDPs comprises:
   transmitting, by the first communication device, a plurality of packets that include respective trigger frames, wherein the packets that include respective trigger frames are transmitted at respective times, and wherein each trigger frame is configured to prompt a respective set of one or more second communication devices to transmit one or more respective first NDPs.

4. The method of claim 1, wherein prompting the selected plurality of second communication devices to transmit the respective first NDPs comprises:
   transmitting, by the first communication device, packets that include respective null data packet announcement frames, wherein the packets that include respective null data packet announcement frames are transmitted at respective times, and wherein each null data packet announcement frame is configured to:
      announce transmission of a respective second NDP by the first communication device, and
      prompt a respective set of one or more second communication devices to transmit a respective set of one or more first NDPs;
   wherein transmitting the one or more second NDPs to the selected plurality of second communication devices comprises transmitting a respective second NDP after transmission of each packet that includes the respective null data packet announcement frame.

5. The method of claim 1, wherein prompting the selected plurality of second communication devices to transmit the respective first NDPs comprises: transmitting, by the first communication device, a packet with a trigger frame that is configured to prompt the selected plurality of second communication devices to transmit the respective first NDPs at respective times.

6. The method of claim 5, further comprising:
   in response to determining, at the first communication device, that one of the selected second communication devices did not begin transmitting the respective first NDP within a predetermined time period, transmitting, by the first communication device, a further packet with a further trigger frame that is configured to prompt one or more remaining selected second communication devices to transmit respective first NDPs at respective times.

7. An apparatus, comprising:
   a network interface device associated with a first communication device, wherein the network interface device is implemented on one or more integrated circuit (IC) devices, and wherein the network interface device is configured to:

determine, by a first communication device, a plurality of second communication devices from a plurality of third communication devices to transmit first null data packets (NDPs);

prompt a plurality of the selected second communication devices to transmit, during a contiguous time period reserved for a range measurement exchange, respective first NDPs at respective times, wherein remaining communication devices of the plurality of third communications are not prompted to transmit the first NDPs during the contiguous time period;

receive the first NDPs from at least some of the selected second communication devices during the contiguous time period, wherein the first NDPs are received at the respective receive power within the receive power range;

transmit one or more second NDPs to the selected plurality of second communication devices, and use reception of the first NDPs and transmission of the one or more second NDPs to determine respective ranges between the first communication device and respective selected second communication devices.

8. The apparatus of claim 7 wherein the network interface device is configured to use transmission of the one or more second NDPs to determine respective ranges between the first communication device and respective selected second communication devices.

9. The apparatus of claim 7, wherein the network interface device is configured to:

transmit a plurality of packets that include respective trigger frames, wherein the packets that include respective trigger frames are transmitted at respective times, and wherein each trigger frame is configured to prompt a respective set of one or more selected second communication devices to transmit one or more respective first NDPs.

10. The apparatus of claim 7, wherein the network interface device is configured to:

transmit packets that include respective null data packet announcement (NDPA) frames, wherein the packets that include respective NDPA frames are transmitted at respective times, and wherein each NDPA frame is configured to:

announce transmission of a respective second NDP by the first communication device, and prompt a respective set of one or more selected second communication devices to transmit a respective set of one or more first NDPs;

transmit a respective second NDP after transmission of each packet that includes the respective NDPA frame.

11. The apparatus of claim 7, wherein the network interface device is configured to:

transmit a packet with a trigger frame that is configured to prompt the selected plurality of second communication devices to transmit the respective first NDPs at respective times.

12. The apparatus of claim 11, wherein the network interface device is configured to:

in response to determining, at the network interface device, that one of the second communication devices did not begin transmitting the respective first NDP within a predetermined time period, transmit a further packet with a further trigger frame that is configured to prompt one or more remaining selected second communication devices to transmit respective first NDPs at respective times.

13. A method for performing a ranging measurement procedure, the method comprising:

receiving, at a first communication device, a packet from a second communication device, the packet including information configured to prompt the first communication device to transmit a first null data packet (NDP) during a contiguous time period reserved for a range measurement exchange involving the first communication, the second communication device, and one or more other communication devices, wherein the first communication device and the one or more other communication devices are determined from a third plurality of communication devices by the second communication device, wherein the contiguous time period reserved for the range measurement exchange does not involve the remaining communication devices of the plurality of third communication devices;

responsive to receiving the packet, transmitting, by the first communication device, the first NDP to the second communication device during the contiguous time period such that the first NDP will be received by the second communication device within a receive power range;

receiving, by the first communication device, a second NDP from the second communication device during the contiguous time period; and wherein the transmission of the first NDP and reception of the second NDP are used to determine a range between the first communication device and the second communication device.

14. The method of claim 13, wherein:

the packet that includes the information configured to prompt the first communication device to transmit the first NDP during the contiguous time period i) includes a trigger frame, and ii) is one packet among a plurality of packets that include respective trigger frames;

the packets that include respective trigger frames are transmitted by the second communication device at respective times;

each trigger frame is configured to prompt a respective set of one or more communication devices in a group of communication devices to transmit a respective set of one or more NDPs; and the group includes the first communication device and the one or more other communication devices.

15. The method of claim 13, wherein:

the packet that includes the information configured to prompt the first communication device to transmit the first NDP during the contiguous time period i) includes a null data packet announcement (NDPA) frame, and ii) is one packet among a plurality of packets that include respective NDPA frames;

the packets that include respective NDPA frames are transmitted by the second communication device at respective times;

each null data packet announcement frame is configured to:

announce transmission of a respective second NDP by the second communication device, and prompt a respective set of one or more communication devices in a group of communication devices to transmit a respective set of one or more NDPs;

the group includes the first communication device and the one or more other communication devices; and the first communication device receives the second NDP from the second communication after receiving the one packet that includes the NDPA frame.

16. The method of claim 13, wherein:
the packet that includes information configured to prompt the first communication device to transmit the first NDP includes a trigger frame that is configured to: i) prompt the first communication device to transmit the first NDP, and ii) prompt at least some of the one or more communication devices to transmit respective other NDPs at one or more other respective times.

17. The method of claim 16, further comprising:
receiving, at the first communication device, a further packet with a further trigger frame that is configured to prompt the first communication device to transmit the first NDP;
wherein the further packet is received during a time period in which one of the other communication devices was expected to transmit another NDP to the second communication device.

* * * * *